Figure 1:
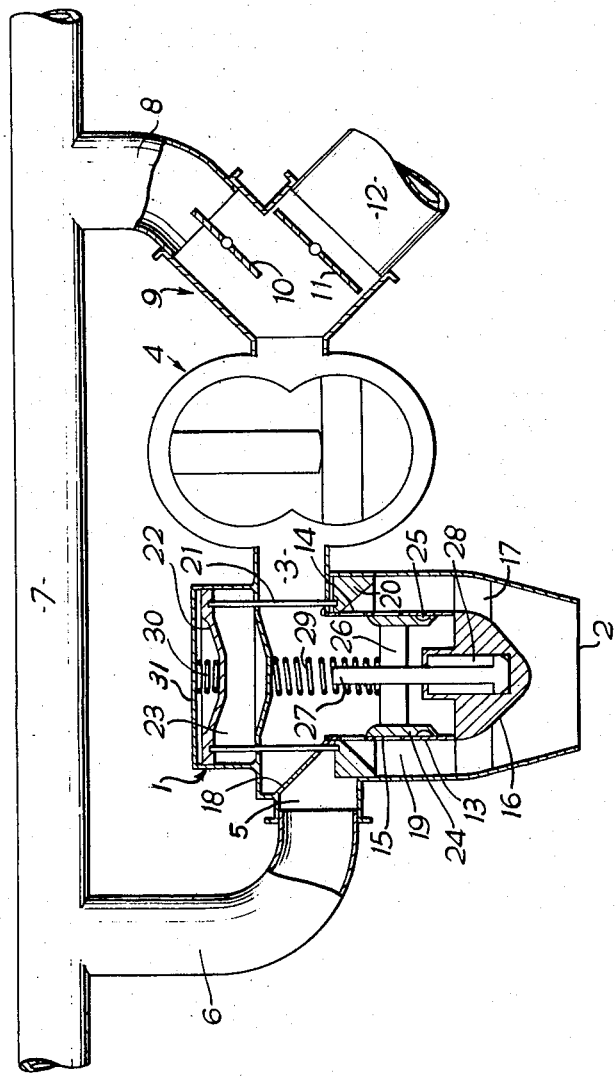

Dec. 31, 1963 H. V. KING 3,115,749
CONTROL VALVES FOR REVERSIBLE AIR MOTORS
Filed May 29, 1961 2 Sheets-Sheet 1

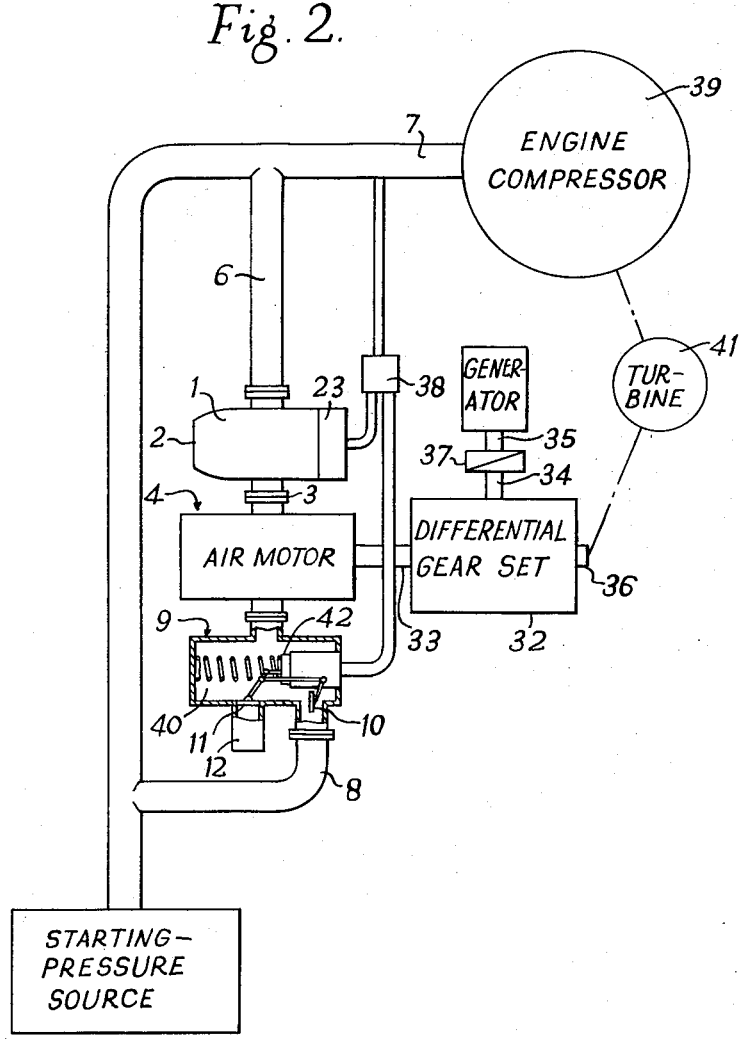

United States Patent Office 3,115,749
Patented Dec. 31, 1963

3,115,749
CONTROL VALVES FOR REVERSIBLE AIR MOTORS
Henry Vernon King, St. Albans, England, assignor to The Plessey Company Limited, London, England, a British company
Filed May 29, 1961, Ser. No. 113,548
Claims priority, application Great Britain June 2, 1960
5 Claims. (Cl. 60—39.14)

This invention relates to control valves for reversible fluid-pressure motors and, although capable of other applications, is primarily intended for the control of the reversible fluid-pressure motor in constant-speed drives of the kind in which the constant output speed is obtained by means of a differential gear interposed between the output, an engine (which may be a turbine) subject to speed variations, and a reversible fluid pressure motor so controlled as to run in one direction to make up deficiencies, and to run in the opposite direction to take up excess, of engine speed, and in which a one-way lock (sprag brake) on the output shaft causes the fluid-pressure motor when running in the last-mentioned direction at low or zero engine speed, to drive the engine for starting purposes. Such drives are described and claimed in co-pending application Serial No. 38,671 filed on June 24, 1960 by Norman Moss and Peter Stanwell and assigned to the assignees of the present invention.

It is an object of the invention to provide an improved control valve of a compact and convenient form, which is suitable for the control of the reversible fluid-pressure motor of such constant-speed drive.

According to the present invention the control valve comprises a stationary valve sleeve having two axially spaced ports, the interior of this valve sleeve being arranged to communicate with one side of the air motor and co-operating with a longitudinally movable slide-valve element, and the outer surface of the valve sleeve forming with a surrounding wall an annular duct, of which one end communicates with a pressure supply while its other end leads to an atmospheric vent, a collar piston being longitudinally movable in the said duct and arranged in a normal position to separate the vent end of the annular duct from that one of the ports of the sleeve which is more remote from the vent end while connecting said port to a pressure supply connection and in a second position to isolate said pressure supply connection and allow communication between said port and the vent end of the annular passage. Preferably the valve element and the collar piston are respectively provided with hydraulic and pneumatic actuating means.

One form of control valve according to the invention is illustrated in the drawing accompanying the specification, in which FIGURE 1 is a somewhat diagrammatic axial section of the valve, also showing diagrammatically the connections of the valve to the air motor and to the common pressure duct of a gas-turbine power installation, and FIGURE 2 is a diagrammatic lay-out of a turbine power plant incorporating the invention.

Referring now first to FIGURE 1, the valve according to the invention has a housing 1 which is closed at one end by an end wall 31 while at its other end an opening 2 leads to the atmosphere. The housing further has an air-motor connection 3 which is connected permanently to one side of an air motor 4 of the rotary-displacement type, and a pressure connection 5 which is connected to a branch 6 of the common air-pressure duct 7 of a gas-turbine power installation. The other side of the air motor 4 is connected to another branch 8 of the common duct 7 via a change-over valve 9 which, by means of two valve elements 10 and 11, enables the last-mentioned side of the air motor to be selectively placed into communication with the common pressure duct 7 or with an atmospheric vent 12.

Fixed coaxially in the housing 1 of the control valve is a cylindrical valve sleeve 13 having two axially spaced sets of orifices distributed around the sleeve, one set forming a control port 14 and the other a vent port 15. The sleeve 13, which is shown closed at one end by a cup-shaped continuation 16, is supported in the housing 1 by a number of radial fins 17 and at its open end, just short of the connection 3 to the air motor 4, it is connected to the outer wall by a more or less radial wall portion 18. It thus provides an annular passage 19 leading from the port 14 which normally communicates with the pressure inlet 5, to the vent outlet 2. This passage is, apart from the ports 14 and 15, separated by the sleeve 13 and continuation 16 from the remainder of the interior of the housing 1, and thus from the pump connection 3. Movable longitudinally along this annular passage 19 is a collar piston 20, which is connected by a number of sliding rods 21 to a pneumatic servo diaphragm 22. This diaphragm is operable by a spring 30 on the release of pressure in a chamber 23, to move the collar piston 20 from the illustrated position, in which control port 14 and vent port 15 intercommunicate through passage 19, to a position in which the collar piston 20 makes sealing contact with the sleeve 13 on the land between the ports 14 and 15, thus separating the control port 14 from the vent port 15.

Slidable inside the valve sleeve 13 is a sleeve-type valve element 24 which near its end adjacent the closed end of sleeve 13 is formed with a peripheral groove 25 for a purpose referred-to further below. The sleeve 24 is connected by fins 26 to a piston rod 27 leading to a double-acting hydraulic ram 28, and the latter is equipped with a biasing spring 29 tending to move the valve sleeve 24 to the illustrated fully retracted position. Referring now to FIGURE 2, in which the same reference numerals as in FIGURE 1 have been used for corresponding parts, the air motor 4 is connected to one element 33 of a three-element differential gear set 32 of which a second element 34 is connected to an output shaft 35 represented as the shaft of a generator representing the element to be driven at a constant speed and in a predetermined direction. An automatic unidirectional clutch 37 is interposed between the element 34 and the shaft 35 to prevent the shaft from being driven in the opposite direction. The third element 36 of the different gear set is operatively connected to a variable-speed turbine engine 41 having an engine compressor 39. An engine-speed reponsive means, including a manifold 38 connected to the line 7 which is connected to an output of the engine compressor 39, further includes spring means 30 (see FIGURE 1) and 40 which respectively urge the annular slide element 24 to the position in which service port 3 leading to one side of air motor 4 communicates with atmospheric port 2 and urging a ram 42, controlling the change-over valve 9, to the illustrated position, in which the service port leading to the other side of the air motor communicates with the pressure line 8. When the pressure line 7 reaches a predetermined valve, the ram 22, 23 reverses the position of the annular slide element 24, and the ram 42 reverses that of the change-over valve 9. In the combined constant-speed drive and starter device described in the said co-pending application the air motor is coupled to one element of a three-element differential gear set of which a second element is coupled to a variable-speed gas-turbine engine having an engine compressor, and the third element of which is coupled to an alternator or other unit to be driven at a constant speed, undirectional locking means being provided which prevent the third element from rotation opposite to that required for driving the alternator or the like.

The operation of the control valve when used in such combined constant-speed drive and starter device is as follows. For starting the engine, the change-over valve 9 is set as illustrated, admitting air pressure from common duct 7 through branch 8 to the air motor 4. The control valve is also set, by the bias spring 29 on the hydraulic ram 28 and by pneumatic pressure in chamber 23 acting on the diaphragm 22, to the illustrated position, in which the collar piston 20 separates the pressure connection 5 from annular passage 19. Air exhausted by the air motor 4 can proceed to the annular passage 19 through connection 3 and the open control port 14 of the valve sleeve 13. Engine-speed responsive means, operated by a pressure derived from the engine compressor are provided which may be constructed substantially as described in the said co-pending application, and which, when the speed of the engine with which the air motor 4 co-operates in the constant-speed drive, is high enough to render the engine self-sustaining, move valve element 10 of the change-over valve 9 to cut off the connection between common-duct branch 8 and the air motor 4, and move valve element 11 to open the vent aperture 12. At the same time these means vent the diaphragm chamber 23 so that the bias spring 30 of the diaphragm 22, acting through the slide rods 21, moves the collar piston 20 to its other end position, in which it allows pressure connection 5 to communicate with the inner side of the fixed sleeve 13 by control port 14 and separates the port 14 from the part of annular duct 19 which communicates with atmospheric opening 2; the sleeve 24, which is controlled by ram 28 according to the output speed of the composite drive, is still in the illustrated low-speed position. Pressure from the common duct 7 is thus enabled to reach the air-motor connection 3 through branch passage 6 and control port 14 to drive the air motor in the direction opposite to that used for starting purposes, the exhaust air from the air motor being free to pass valve element 11 and escape through vent 12. This, in the construction described in the said co-pending application, has the effect of increasing the output speed of the constant-speed drive over the speed contributed by the engine. When the desired output speed is approached, ram 28 moves the slide-valve sleeve 24 to cover part of port 14, thus reducing the admission of compressed air to the air motor 4 and accordingly limiting the speed of the latter, and as the turbine speed increases towards normal cruising speed, the apertures constituting the pressure port 14 are progressively covered by the sleeve 24 until, when the turbine contributes exactly the desired output speed, the sleeve 24 covers completely the control port 14, while still completely covering the vent port 15. Under these conditions the air motor is held substantially stationary; while no air is admitted from common duct branch 6 to drive the air motor in the output-speed increasing direction, the air motor is also prevent from being rotated in the opposite direction by reaction forces created in the differential gear, because there is no outlet for the air which in this case would be pumped by the air motor from vent 12 to connection 3.

If now the engine speed rises further, the ram 28 moves the piston 24 further in the same direction, thus beginning to uncover vent port apertures 15, and so permitting the reaction torque of the differential gear to drive the air motor 4 in the output-speed decreasing direction; the speed at which the air motor rotates under these conditions is determined by the amount by which the port apertures 15 are uncovered by the piston 24, that is to say by the amount of excess output speed.

A groove 25 is provided in the slide valve piston 24 to permit the speed of the air motor under these conditions to be increased beyond that available by merely fully opening the port apertures 15. When the piston 24 reaches the extreme high-speed position, the groove 25 establishes a narrow conduit by-passing the edge of the collar piston 20 and admitting air from common duct branch 6 into annular duct 19 to produce a jet-pump suction effect which reduces the pressure against which the air motor delivers air at connection 3 below the minimum pressure which would be available by merely fully opening the apertures 15. The provision of the groove 25 thus makes it possible to compensate for an even higher turbine speed.

When it is intended to operate the drive on the ground without running the engine, for example for testing the electrical equipment, the same valve positions are used as in starting, that is to say the valves will be positioned as shown in the drawing, but the differential gear set is mechanically locked and the engine is disconnected from the drive in any suitable manner. The initial operation of the air motor and control valve is the same in this case as has been described in the starting operation, but since the engine and its compressor are stationary, no reversal of the starting valve 9 and of the collar piston 20 is effected at any speed. When the air motor speed is sufficient to produce the desired output speed, piston 24 is however, operated by ram 28 to progressively close pressure port 14, thus regulating the exhaust from the air motor 4 to the vent aperture 2 in such manner as to maintain the output speed substantially constant.

What I claim is:

1. A control valve for a reversible air motor, comprising an inner closed housing portion including a cylindrical sleeve having an air-motor connection and having coaxially arranged internal and external cylinder surfaces interconnected by two axially spaced ports, an outer housing portion having a tubular wall encircling said sleeve in spaced fixed relation to form therewith a passage of annular cross-section, said outer portion being, at one end of said passage, sealingly joined to said inner housing portion with the ports between this junction and the other end of the passage, the outer housing portion having a pressure inlet adjacent to said end, the other end of the passage being substantially open to the atmosphere, and the inner surface of said tubular wall being cylindrical and coaxial with the sleeve for at least part of its length, an annular slide element arranged in said passage for movement axially of the sleeve in sealing contact with both the tubular wall and the sleeve, pressure-responsive means operatively connected to said annular slide element and to at least one of the housing portions and operable to move the annular slide element from a first position in which it separates that portion of the annular passage which communicates with the pressure inlet from both said ports in the sleeve, to a second position in which the annular slide element divides said annular passage into two portions respectively communicating with two ports, a slide-valve element co-operating with the inner surface of the sleeve and movable axially of said sleeve, and hydraulic means operatively connected to the slide-valve and to at least one of the housing portions and operable to move the slide-valve element to any selected position between a first position in which it covers the sleeve port farthest from the closed end of the passage and uncovers the sleeve port nearest to said closed end so as to admit pressure from the pressure inlet to the air-motor connection if the annular slide element is in the second position, a neutral position in which it substantially covers both said ports and a second position in which it uncovers the sleeve port farthest from the closed end of the passage and covers the sleeve port nearest to said closed end, so as to establish communication between the atmosphere and the air-motor connection.

2. A control valve for a reversible air motor, comprising an inner closed housing portion including a cylindrical sleeve having an air-motor connection and having coaxially arranged internal and external cylinder surfaces interconnected by two axially spaced ports, an outer housing portion having a tubular wall encircling said sleeve in spaced fixed relation to form therewith a passage of annular cross-section, said outer portion being, at one end of said passage, sealingly joined to said inner housing portion with the ports between this junction and the other end of the passage, the outer housing portion having a pressure inlet adjacent to said end, the other end of the passage being substantially open to the atmosphere, and the inner surface of said tubular wall being cylindrical and coaxial with the sleeve for at least part of its length, an annular slide element arranged in said passage for movement axially of the sleeve in sealing contact with both the tubular wall and the sleeve, means operatively connected to said annular slide element and operable to move the annular slide element from a first position in which it separates that portion of the annular passage which communicates with the pressure inlet from both said ports in the sleeve, to a second position in which the annular slide element divides said annular passage into two portions respectively communicating with said two ports, a slide-valve element co-operating with the inner surface of the sleeve and movable axially of said sleeve, and means operatively connected to the slide-valve and operable to move the slide-valve element to any selected position between a first position in which it covers the sleeve port farthest from the closed end of the passage and uncovers the sleeve port nearest to said closed end so as to admit pressure from the pressure inlet to the air-motor connection if the annular slide element is in the second position, a neutral position in which it substantially covers both said ports and a second position in which it uncovers the sleeve port farthest from the closed end of the passage and covers the sleeve port nearest to said closed end, so as to establish communication between the atmosphere and the air-motor connection.

3. The combination of a control valve as claimed in claim 2 with a reversible-flow displacement-type air motor having two air connections separated by displacement means, one of said connections communicating with the air-motor connection of the control valve and a change-over valve having a service connection communicating with the other air-motor connection, a pressure-inlet port and an atmospheric port, and operable to establish alternatively communication between said service port and either the pressure-inlet port or the atmospheric port.

4. A combination as claimed in claim 3, including a variable speed combustion engine, a three-element differential gear set having a first element operatively connected to the air motor, a second element operatively connected to an output shaft to be driven at a constant speed in a predetermined direction, and a third element operatively connected to the engine, the combination also including an automatic unidirectional brake preventing rotation of said output shaft oppositely to said predetermined direction, and engine-speed responsive means operatively connected to the change-over valve and to the annular slide element and operative to maintain, when the engine speed is below a predetermined value, the annular slide element in said first position and the change-over valve in the position establishing communication of the service port with the pressure-inlet port, and to establish, when the engine speed reaches said predetermined value, to move the annular slide element to its said second position and the change-over valve to the position establishing communication of the service port with the atmospheric port.

5. The combination claimed in claim 4, wherein the engine-speed responsive means includes a turbo-compressor driven by the engine, spring means urging the annular slide element to its first position and the change-over valve to the position establishing communication between the service port and the pressure-inlet port, and means responsive to pressure from said compressor and operative when said pressure reaches a predetermined value to reverse the positions of said annular slide and of said change-over valve.

References Cited in the file of this patent
UNITED STATES PATENTS
2,908,189  Parker et al. _____ Oct. 13, 1959